(12) United States Patent
Pentikäinen

(10) Patent No.: US 6,480,715 B1
(45) Date of Patent: Nov. 12, 2002

(54) RECOVERING GROUP DATA BETWEEN MOBILE SYSTEMS

(75) Inventor: Jukka Pentikäinen, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/490,964

(22) Filed: Jan. 24, 2000

Related U.S. Application Data

(63) Continuation of application No. PCT/FI98/00604, filed on Jul. 22, 1998.

(30) Foreign Application Priority Data

Jul. 25, 1997 (FI) .................................................. 973125

(51) Int. Cl.$^7$ ................................................. H04Q 7/20
(52) U.S. Cl. ...................... 455/433; 455/435; 455/519; 455/518
(58) Field of Search ................................. 455/432, 433, 455/435, 561, 518, 519, 520, 456, 422, 512

(56) References Cited

U.S. PATENT DOCUMENTS

| | | | |
|---|---|---|---|
| 5,465,391 A | * 11/1995 | Toyryla | 455/422 |
| 5,509,118 A | 4/1996 | Tuulos et al. | 714/16 |
| 5,564,071 A | 10/1996 | Liou et al. | 455/520 |
| 5,634,197 A | * 5/1997 | Paavonen | 455/518 |
| 5,724,648 A | * 3/1998 | Shaughnessy et al. | 455/519 |
| 5,752,196 A | 5/1998 | Ahvenainen et al. | |
| 5,797,100 A | * 8/1998 | Dettner | 455/518 |
| 5,809,018 A | * 9/1998 | Lehmusto | 370/330 |
| 5,901,353 A | 5/1999 | Pentikainen | |
| 5,924,041 A | * 7/1999 | Alperovich et al. | 455/456 |
| 5,930,723 A | 7/1999 | Heiskari et al. | |

FOREIGN PATENT DOCUMENTS

| | | |
|---|---|---|
| EP | 0 702 497 | 3/1996 |
| FI | 944887 | 7/1997 |
| FI | 945495 | 9/1997 |
| FI | 951270 | 10/1997 |
| WO | WO 93/25051 | 12/1993 |
| WO | WO 96/16519 | 5/1996 |
| WO | WO 96/29838 | 9/1996 |
| WO | WO 97/39413 | 10/1997 |

OTHER PUBLICATIONS

ETS 300 392–3–5, "Part 3: Inter–working—basic operation; Part 3–5: Additional Network Feature Inter–System Interface for Mobility Management (ANF–ISIMM)", *European Telecommunications Standards Institute*, Version 0.0.13, 167 pages, Mar. 1997.

MPT 1327, "A Signalling Standard for Trunked Private Land Mobile Radio Systems", Jan. 1988, Revised and reprinted Nov. 1991.

* cited by examiner

*Primary Examiner*—Thanh Cong Le
*Assistant Examiner*—Lana Le
(74) *Attorney, Agent, or Firm*—Altera Law Group, LLC

(57) ABSTRACT

A method for recovering group data between mobile systems, which incorporate at least one first mobile system, at least one second mobile system, and mobile stations, the method comprising the steps of maintaining group data in a first database of the first mobile system, maintaining group data in a database of the second mobile system. In the method, a recovery request is made for recovering the group data, the second mobile system generates one or more virtual attachment requests for the first database of said group, the second mobile system transmits the virtual attachment request to the first database of the first mobile system, in response to the first virtual attachment request, the group data are updated in the first database.

14 Claims, 3 Drawing Sheets

RECOVERING GROUP DATA BETWEEN MOBILE SYSTEMS

This application is a continuation of international application serial number PCT/FI98/00604, filed Jul. 22, 1998.

BACKGROUND OF THE INVENTION

The invention relates to a method for recovering group data between mobile systems, which incorporate at least one first mobile system, which comprises a first database, at least one second mobile system, which comprises a second database and a service area, and which mobile systems incorporate mobile stations as subscribers, the method comprising the steps of maintaining group data in said first database of said first mobile system, and maintaining group data in said second database of said second mobile system.

The invention relates to a plurality of mobile systems, in particular mobile systems which comprise control centres, one or more databases, base stations and radio telephones, the mobile systems having a cellular structure and each cell having at least one base station which communicates by means of one or more radio connections with at least one mobile station. The radio connection may be established by channels, of which one or more are typically used for signalling and the rest for traffic.

The method of the invention is intended for use particularly in so called trunking mobile systems, which are typically company networks or private mobile radio networks used by authorities, all the channels in these networks being allocated to one or more companies or authority organizations. In these networks, the subscribers have, apart from their own subscriber numbers, group numbers, which indicate to which group call group said subscriber belongs, whereby the calls, particularly the group calls, that are intended for all subscribers of said group, can be switched to said group subscribers.

The invention is applicable to mobile systems with either digital or analogue radio paths. Analogue mobile systems are described, for instance, in the British Department of Trade and Industry publications MPT 1327, *A Signalling Standard for Trunked Private Land Mobile Radio Systems*, January 1988, revised and reprinted November 1991, issued by the Radiocommunications Agency, and MPT 1343, *Performance Specification*, January 1988, revised and reprinted September 1991, issued by the Radiocommunications Agency.

A group call is one of the key functions in a private mobile radio network. A group call is used, among other things, in various operations involving several participants, particularly when an entire group must know all the time how things proceed. A group call is a call in which all participants may take turns to speak and to listen to each other. In group calls the whole group is called by one call number. A single radio unit, for instance, a mobile station or a radio telephone, i.e. a subscriber station, may belong to a plurality of groups which are programmed in the mobile station. Programming can be carried out permanently, but it can also be changed by the user or even by the system. Each mobile system may maintain a file on base stations relating to each group number. A group call may cover one, several or all base stations in the service area of a mobile services switching centre and a plurality of mobile services switching centres, or a group call can be established within the service area of several mobile systems.

When establishing a group call a traffic channel is allocated in all base stations relating to the group, and each of these base stations transmits. a group call request which comprises the group number and information on the allocated traffic channel. If the mobile station identifies the group number included in the group call request, it transfers to the traffic channel indicated by the group call request. Thus the mobile station that is registered in the operating area predetermined to the group, is in principle always available for a group call.

In connection with cellular radio networks it is known that group data of the radio telephones registered in said mobile system are stored in the database of the trunking mobile system, for instance in the switching centre or in its visitor location register or home location register.

The group data (group profile) contain data that inform the subscribers of said group, or some subscribers of the group, of available or activated services, for instance, of supplementary services. The group profile may also contain definition of importance, i.e. priority, of said group or its subset. Moreover, the group profile may contain information which subscribers belong to said group, i.e. a list which includes the identifiers of such subscribers that are allowed to participate in communication within said group, e.g. in a group call, in the service area of said mobile system, in its specific location areas (Location Area) or its specific base stations.

This group profile is stored, for instance, in a volatile RAM memory, wherefrom the data disappears, for instance, when the power supply for the database is switched off, and at regular intervals in a non-volatile memory means, for instance, on a hard disk on which the data are maintained permanently. When the RAM database at times restarts itself, the group profile stored in the volatile memory disappears. Only the group data stored in the non-volatile memory, for instance, on the hard disk; remain.

The disappearance of group data from the databases causes a serious problem in the group of a plurality of mobile systems, since if a given group call extends to the service areas of several mobile systems, group data of the group call are stored in the databases of all said several mobile systems. Hence, if the database of any one of the mobile systems has to be driven down and since the down-driven database cannot continuously update the changes that have taken place in the group's group profile, these data may change in the meantime in the databases of other mobile systems, but remain unchanged in said down-driven database. As a consequence, the group data contained in the databases of different mobile systems become different, on one hand in the down-driven database and on the other hand in other normally functioning databases.

This difference between the group data of the databases may bring about a situation that a given mobile station is allowed to join a group call in a first mobile system, but in a second mobile systems aid mobile station is not allowed to join the same group call, since the data of said group have not been maintained updated in said mobile system, nor in its database.

In accordance with the prior art, it is possible to try to maintain the database contents of various mobile systems consistent by using so called recovery.

The recovery method utilizes a normal inter-network sequence of mobile systems, or the like, by which sequence attachment and detachment requests sent by subscriber terminals operating in the network are processed, the requests being addressed to a group of another network. In the TETRA mobile system this sequence is an ANF-ISIMM sequence; That sequence is described in the TETRA specification ETS 300 392-3-5, Part 3: *Inter-working basic operations*; Part 3–5. *Additional Network Feature Inter-System Interface for Mobility Management (ANF-ISIMM)*, ETSI, March 1997, 167 pages.

A normal update sequence of group profile starts, when a subscriber terminal sends an attachment request to a mobile system and said mobile system is not the group's home-mobile system. In the TETRA mobile system, the home mobile system is home SwMI, and correspondingly, the visited mobile system is visited SwMI. The visited mobile system thus communicates the attachment request to the group's home mobile system which stores in its database information on the attachment and replies to the visited mobile system by sending it the group profile. The visited mobile system stores the attachment and other group data in its database. The group data are kept stored in the database of the visited mobile system as long as there is at least one valid attachment request for said group.

When the visited mobile system receives an attachment request from the subscriber terminal, any of the following procedures can be applied:

1) If several subscriber terminals send attachment requests for the same group of a second mobile system in the same visited mobile system, the visited mobile system sends the attachment request only once to the home mobile system upon receipt of the first attachment request. The home mobile system of the group call is the system in the database of which the group profile of said group is stored, for instance.

2) The above-described procedure can be supplemented with a so called 'important user' definition: important users can be defined in the group, and the attachment request sent by them is always communicated to the home mobile system of the group. Thus, the important users are prioritized users.

3) Alternatively, the visited mobile system always sends the attachment request to the home mobile system upon receipt of an attachment request from a subscriber terminal.

In accordance with a corresponding principle as the one described above, the visited mobile system communicates one or more detachments requests received from radio subscribers to the homed mobile system. The detachment requests are communicated one per group or important user or subscriber. Hence the attachment data are deleted from the database of the home mobile system and the attachment and other group data are deleted from the databases of the visited mobile systems correspondingly.

If the visited mobile system sends the attachment request to the home mobile system only once when receiving the first attachment request, the detachment request is sent to the home mobile system only after it is received from the last subscriber attached to said group in the visited mobile system. All data of said group are thus deleted from the database of the visited mobile system. In addition, as for this subscriber, the attachment data of said subscriber is deleted from the database of the group's and the subscriber's home mobile system.

A detachment request received from an important user always deletes the attachment data concerning said subscriber from both databases. In addition, the previous rule is applied to a detachment request received from an important user, if said user/subscriber was the last subscriber of the group.

If the visited mobile system always sends an attachment request to the home mobile system upon receipt of an attachment request from a subscriber terminal, the detachment request is also always sent to the home mobile system. If the detachment request arrives from the last subscriber attached to said group in the visited mobile system, all data of said group are deleted from the database of the visited mobile system. In addition, as for this subscriber, the attachment data of said subscriber is deleted from the database of the group's and the subscriber's home mobile system.

FIG. 1 illustrates a radio subscriber 'visited SwMI/MM' 101, a visited mobile system 'visited SwMM/FE3' 102 and a home mobile system. 'Home SwMI/FE2' 103. The figure shows the parameters transmitted in each message or signal. GTSI, i.e. Group Tetra Subscriber Identity, is a group identifier, ITSI is a radio subscriber identifier. The ITSI identifier need not be transmitted if the first attachment request and the last detachment request of the group are only communicated to the home mobile system, in other words, if important subscribers are not favoured or prioritized and all attachment requests are not communicated.

In FIG. 1, the mobile station 101 sends an attachment request 105 by which the mobile station wishes to be attached to a group within the service area of the visited mobile system concerned; In response to the above-mentioned request, the visited mobile system checks the database whether the visited mobile system is ready to support the use of said group. In the affirmative, the visited mobile system forwards 106 the attachment request to the home mobile system FE2 103 of the group. The home mobile system checks its database whether it is ready to support the use of said group in the visited mobile system for said subscriber. In the affirmative, the home mobile system transmits 107 the data of said group to the visited mobile system which sends 108 an acknowledgement. After receiving it, the home mobile system sends 109 an acknowledgement to the visited mobile system 102 that the whole sequence has succeeded. The visited mobile system further acknowledges 110 the mobile station 101. The above-described sequence is an example of a prior art procedure, in which the first subscriber/mobile station wishes to be attached to a group in the service area of said mobile system in a situation where the attachment is viable.

BRIEF DESCRIPTION OF THE INVENTION

The object of the invention is to provide a method and an equipment implementing the method to the effect that the above problems can be solved.

This is achieved with a method characterized in that the method further comprises the following steps: a recovery request for recovering group data is made; the second mobile system generates one or more first virtual attachment requests for the first database of said group; the second mobile system sends the first virtual attachment request to the first database of the first mobile system; in response to the first virtual attachment request, said group data are updated in the first database.

The invention also relates to an arrangement for recovering group data between mobile systems, in which there are at least one first mobile system which comprises a first database where group data are maintained, at least one second mobile system which comprises a second database where said group data are maintained, and in which there are mobile stations.

The arrangement in accordance with the invention for recovering the group data between mobile systems is characterized in that the first mobile system comprises first generating means for generating a virtual attachment request for the second database and for transmitting the virtual attachment request to the second database of the second mobile system, whereby the second database is arranged to update the group data in the second database in response to said virtual attachment request, and that the second mobile system comprises second generating means for generating a virtual attachment request for the first database and for transmitting the virtual attachment request to the first database of the first mobile system, whereby the first database is arranged to update the group data in the first database in response to the virtual attachment request.

The invention is based on the idea that the recovery of subscriber group data can be carried out in such a way that a virtual attachment request, generated by the system, is sent for each visiting subscriber from a visited mobile system or a visited node to the home mobile system or the home node, whereby the group data and possibly the location and subscriber data concerning the subscriber are updated in all databases in accordance with the normal attachment sequence.

The idea of the invention is to recover the data of group call groups between interconnected mobile systems by sending to the home mobile system of each group an attachment request, similar to a normal attachment request, generated by the visited mobile system, for each group of another mobile system in use in the visited mobile system, whereby the group data are updated in the mobile systems in accordance with the normal attachment sequence. The invention also relates to an idea, according to which the home mobile system keeps a record, during the recovery, of what attachment data are processed in recovery. When the home mobile system receives a notification from the visited mobile system that the part of the visited mobile system is over, the home mobile system goes through its database and compares whether there are attachment data concerning the visited mobile system that have remained unprocessed, because the visited mobile system did not notify thereof. The home mobile system transmits said attachment data to the visited mobile system by a virtual attachment request according to the normal attachment sequence. The virtual attachment requests include the age of said attachment data. The visited mobile system accepts the attachment request received from the home mobile system if the visited mobile system has not stored later, corresponding detachment data. The visited mobile system may reject the attachment request also for some other reason, for instance, if the visited mobile system does not support the group in question.

Further alternatively, the home mobile system does not keep a record of the attachment data transmitted by the visited mobile system,but retrieves from its database all the attachment data relating to the visited mobile system and transmits them to said visited mobile system. An advantage of this procedure is simplicity, since record keeping is not needed. However, in this case the resource consumption is not optimal.

The invention relates to a method and an arrangement for recovering group call group data, i.e. a group profile, of visiting subscribers between mobile systems and/or databases of mobile networks.

The invention is used for detecting and correcting inconsistencies in group profiles in interconnected TETRA mobile networks.

An advantage of this kind of a method in accordance with the invention is that it solves the problems of the prior art solutions.

The method and arrangement in accordance with the invention also have the advantage that the method utilizes normal group data processing sequences. This simplifies the implementation of recovery and improves reliability.

The invention also alleviates loading problems of mobile systems, since by means of the invention the loading caused by recovery is automatically adjusted according to load conditions of each mobile system or connections between mobile systems, if the recovery is carried out in accordance with the most preferable embodiment, i.e. transmission synchronization employing acknowledgments.

Further, the invention has an advantage that no data need be deleted from the databases, unless there are more correct data vis-a-vis the data previously stored in the database.

The invention also has an advantage that the method of the invention allows starting in a variety of ways, for instance, periodically, at the user's command or as a result of a detected or assumed fault.

A further advantage of the invention is that it is suitable for background processing in the mobile system.

The invention further has an advantage that it is not bound to impulses coming from subscriber terminals. Therefore, it is possible to recover with the method of the invention also in cases where no impulse is received from the subscriber.

One advantage of the invention is also that therewith it is possible to make the recovery rate and loading adjustable in accordance with other loading in mobile systems.

The invention has an advantage that the rate of recovery implemented therewith does not depend on a random time of arrival of the impulses.

The invention has an advantage that it does not consume radio resources at all.

The invention has an advantage that by synchronizing the transmission of a new attachment request with the acknowledgment of the preceding one, the recovery load can be adjusted in accordance with the total load, when there is available capacity.

The invention has an advantage that an additional load caused by it is minimal, when some part of the system is loaded for some other reason.

The invention has an advantage that when operating in accordance therewith, a node of the mobile system does load another node or connection in a way that is unmanageable to them.

BRIEF DESCRIPTION OF THE DRAWINGS

In the following, the invention will be described in greater detail in connection with preferable embodiments with reference to the attached drawings, in which.

DETAILED DESCRIPTION OF THE INVENTION

Recovery

Figure 1:
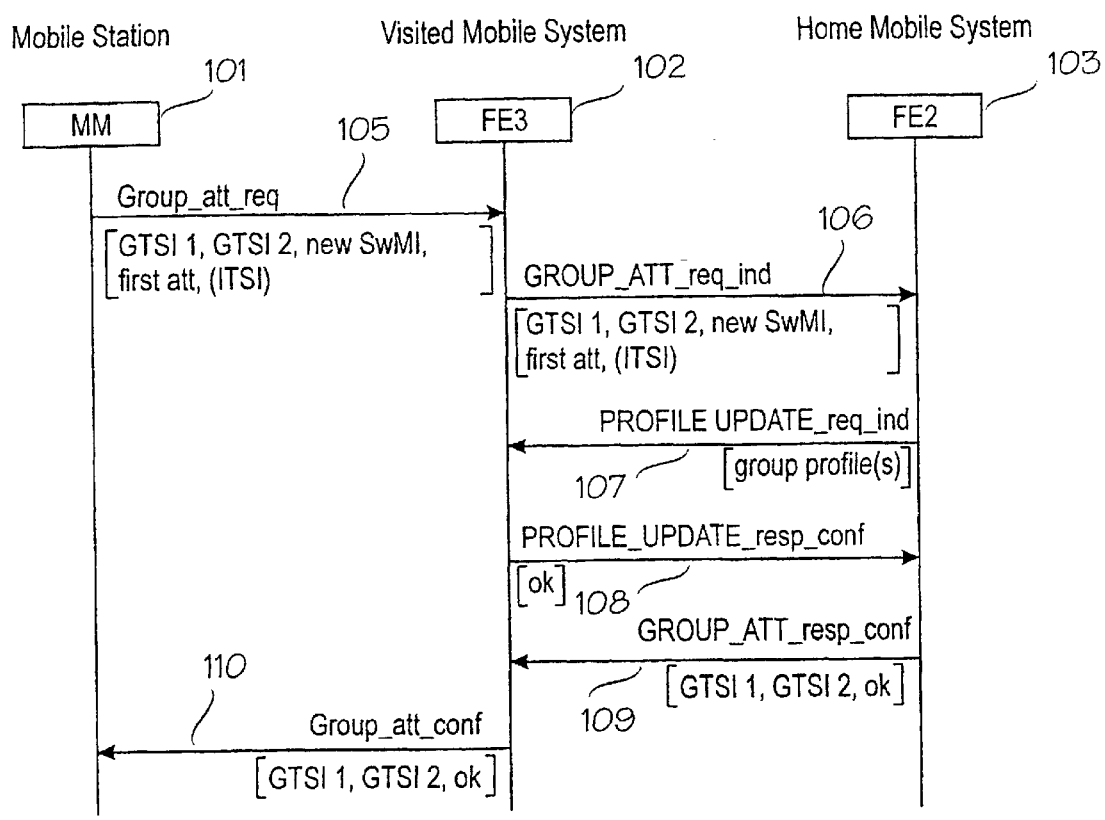
FIG. 1 illustrates a message diagram of a prior art method.
Figure 2:
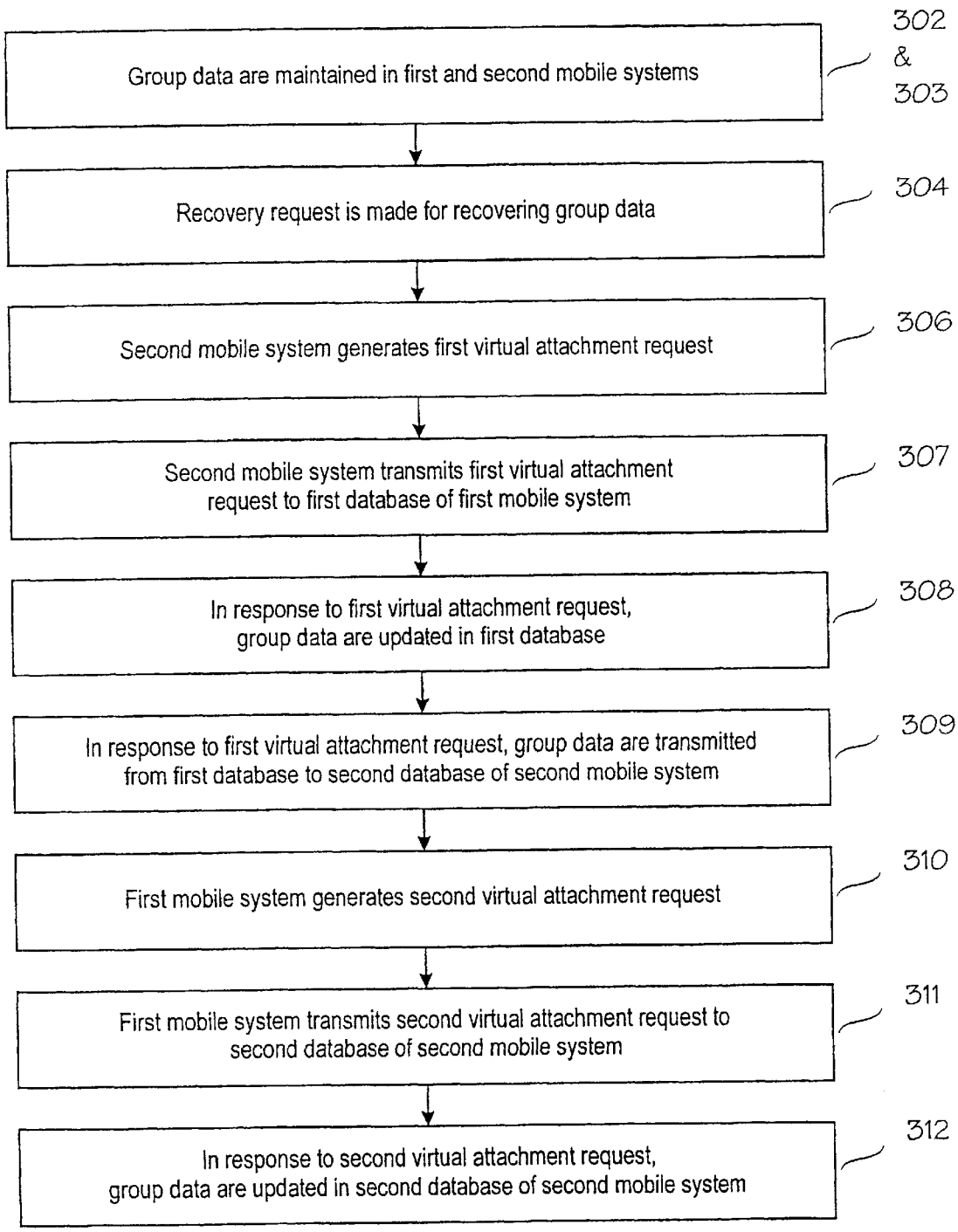
FIG. 2 is a flow chart of the operation of the method of the invention.
Figure 3:
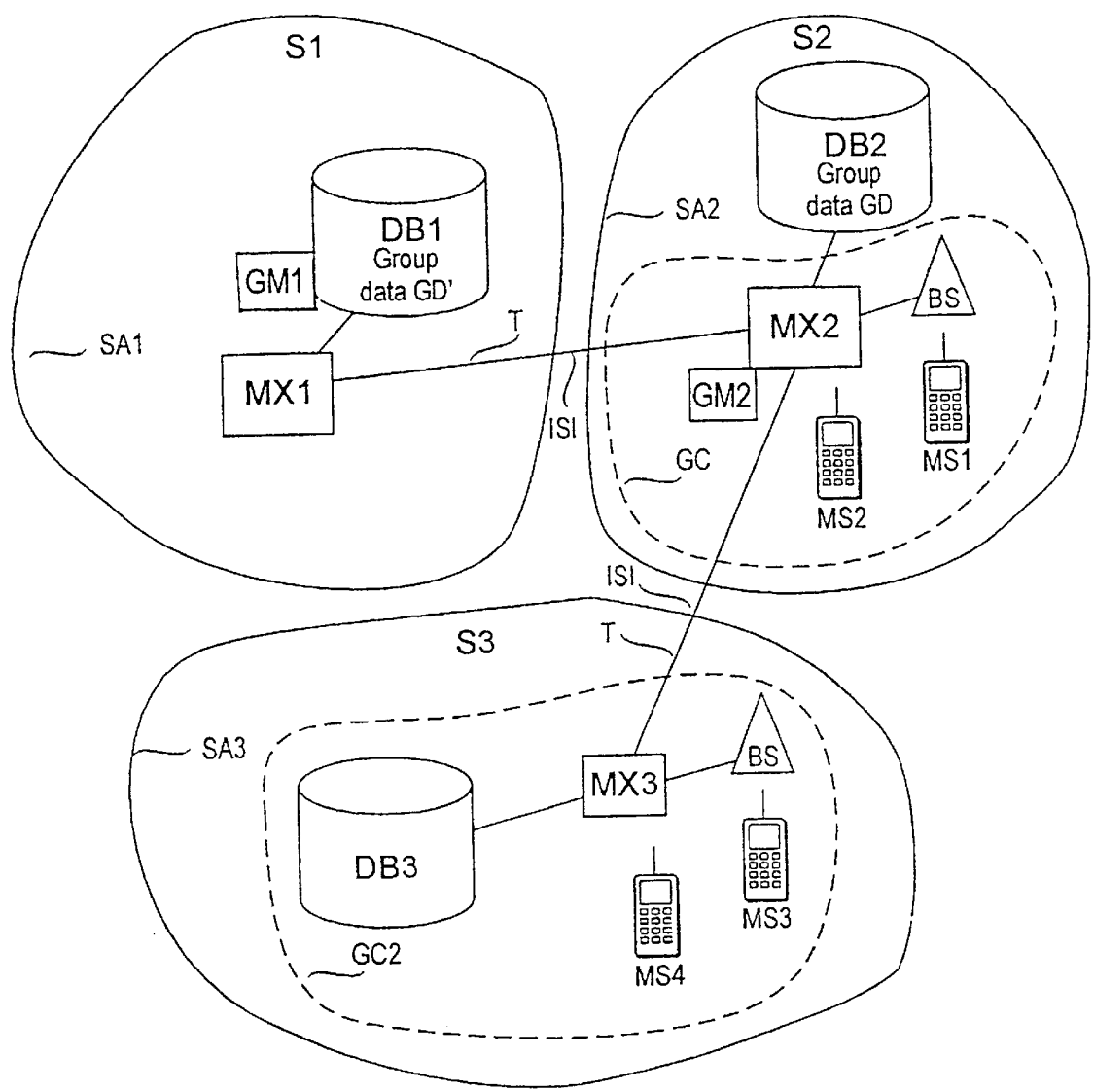
FIG. 3 is a block diagram of an arrangement in accordance with the invention.

FIG. 2 shows a flow chart of the operation of the method of the invention. Correspondingly, FIG. 3 shows an arrangement, by means of which the method of FIG. 2 can be implemented. The block diagram of FIG. 3 illustrates an arrangement for recovering group data GD between mobile systems S1, S2, S3, in which there are at least one first mobile system S1 comprising a first database DB1 and a service area SA1, at least one second mobile system S2 comprising a second database DB2 and a service area SA2, and in which there are mobile stations MS1, MS2. The described mobile systems are interconnected with telecommunication connections T over the inter-system interface ISI between the mobile systems. The ISI interface and its operation are described in the above-mentioned ETSI specification ETS 300 392-3-5. The mobile systems have at least one mobile services switching centre MX1 to MX3, to which are connected at least one database DB1 to DB2 and typically one or more radio units, a base station BS, may serve as such a unit.

The recovery of group data can be started on the initiative of either the group's home mobile system or visited mobile system. The recovery can be started, for instance, periodically, at the user's command or as a result of a detected or suspected fault. The recovery may involve one or more visited mobile systems and one or more home mobile systems. The recovery can be effected simultaneously or successively for a plurality of mobile systems.

If the recovery is set up on the initiative of the home mobile system, it transmits a recovery start request to all those visited mobile systems with which recovery is desired.. On receiving the setup request, the visited mobile systems start recovering data of said home mobile system groups that exist in their databases.

If the recovery is set up on the initiative of the visited mobile system, it transmits a recovery start notification to the home mobile systems with which it wishes to perform recovery, and starts recovering data of said mobile system groups that exist in its database.

If desired, the recovery of group data can be combined with the recovery of location and subscriber data, for instance, by recovering subscriber-specifically the group data relating to each subscriber immediately, or for instance, by recovering the group data after the location and subscriber data of all subscribers have been recovered.

If desired, the arrival of setup messages can be ensured, for instance, with a transmission protocol which comprises acknowledgments and retransmission of the setup message, if necessary.

The recovery can be carried out in such a way that the visited mobile system goes through its database and transmits in accordance with its normal attachment sequence one or more virtual attachment requests per group to the home mobile system of each second network group, found in its database, participating in the recovery.

Virtual attachment requests contain the age of said attachment data. The home mobile system accepts the attachment request coming from the visited mobile system, if the home mobile system has not stored a later corresponding detachment data. The home mobile system then updates 308 the corresponding attachment data in its database and transmits 309 the data of that group to the visited mobile system. The home mobile system may reject the attachment request also for some other reason, for instance, if said subscriber is not entitled to join the group. The home mobile system also checks, in accordance with the normal sequence, whether the subscriber is registered in said visited mobile system according to the information in the home mobile system, if not, the home mobile system starts a normal correction sequence of location and similar data.

The attachment and other data (group profile) relating to the group are updated both in the visited mobile system and in the home mobile system in accordance with the normal attachment/detachment sequence. Moreover, the visited mobile system always verifies that the subscriber, who is attached to the group, also has the valid registration for'said visited mobile system. If the registration does not exist, the attachment data is deleted in accordance with the normal attachment/detachment sequence principle.

Mobile systems do not necessarily store in their databases any group call detachment data after the normal detachment sequence is completed.

The visited mobile system transmits virtual attachment requests to the home mobile systems according to the same principles as normal attachment requests.

If the normal procedure is that the visited mobile system transmits the attachment request to the home mobile system only once after receiving the first attachment request for said group, in recovery only one virtual attachment request per group is transmitted.

If the above-mentioned procedure is supplemented With a so called important user definition, in recovery a virtual attachment request per every important subscriber in the group is transmitted, provided that the group call involves one or more important and prioritized subscribers.

If the visited mobile system normally transmits an attachment request to the home mobile system every time it receives the attachment request from the subscriber terminal, in recovery a virtual attachment request is transmitted for every subscriber attached to the group.

If the normal sequence is optimized to the effect that the home mobile system does not transmit the group profile of a group call to the visited mobile system every time it receives an attachment request from the visited mobile system, the recovery sequence of the invention must be supplemented in such a way that the transmission of the group profile is ensured in recovery. This can be performed either so that, in recovery, a) in the virtual attachment message, the visited mobile system requests, at least once for every relevant group, the home mobile system to transmit the group profile to said visited mobile system.

This solution requires a field for this purpose in the ISI attachment message between different TETRA mobile systems, or b) the home mobile system ensures that it transmits the group profile at least once per each relevant group to each relevant visited mobile system.

During the recovery, the home mobile system keeps a record of which attachment data are processed in recovery. When the home mobile system receives a notification from the visited mobile system that the part of the visited mobile system is over (see termination of recovery), it goes through the database and compares whether the database contains attachment data which relate to the visited mobile system and which remain unprocessed, since the visited mobile system did not notify thereof. The home mobile system generates 310 second attachment requests and transmits 311 these virtual attachment data to the visited mobile system in virtual attachment requests in accordance with the normal attachment sequence. The virtual requests contain the age of said data. The visited mobile system accepts the attachment request coming from the home mobile system, if the visited mobile system has not stored a later corresponding detachment data. The visited mobile system then updates 312 in its database said group data, of which the home mobile system notified. The visited mobile system may reject the attachment request also for some other reason, for instance, if it is not possible or allowed to form the group in said visited mobile system.

Alternatively, the home mobile system does not keep a record of the attachment data transmitted by the visited mobile system, but retrieves from its database all attachment data relating to said visited mobile system, generates 310 second virtual attachment requests and transmits 311 them to said visited mobile system. Simplicity is an advantage of this procedure, since no record keeping is needed. On the other hand, resource consumption is not optimal in this case.

If desired, the recovery of group data can be combined with the recovery of location and subscriber data, for instance, by recovering subscriber-specifically the group data relating to each subscriber as soon as the subscriber's location and subscriber data have been recovered, or for instance, by recovering the group data after the location and subscriber data of all subscribers have been recovered.

If desired, the recovery of group data between the subscriber terminal and the mobile systems can be combined with the recovery of group data between the mobile systems. The order of performance of these recovery operations can be selected in a desired manner.

If desired, the arrival of messages sent in a sequence can be ensured, for instance, with a transmission protocol comprising a retransmission of the message, if necessary.

The unprompted part of the visited mobile system terminates for each home mobile system, when it detects having recovered the data of all groups in said network. The visited mobile system transmits a notification to the home mobile system of each group call formed in its coverage area of the termination of its part. The unprompted part of the visited mobile system terminates completely, When all the group calls of the home mobile system are processed.

The home mobile system processes for each visited mobile system the attachment data that have remained unprocessed in the part of the visited mobile system, when it receives a notification of the termination of the part of said visited mobile system. The recovery terminates for said visited mobile system, when the attachment data are processed with said visited mobile system.

Recovery terminates in the home mobile system, after it has received a termination notification from all the visited mobile systems with which recovery was performed, and after the home mobile system has processed the unprocessed attachment data in its database. If desired, the home mobile system may also notify the participating visited mobile systems of the termination of recovery. This data can be used for the information of users, for instance.

In the method of the invention, the group data GD are maintained 302 in the first database DB1 of the first mobile system S1, and additionally, the group data GD are maintained 303 in the second database DB2 of the second mobile system S2. In this case, as described in the above specification part in connection with prior art problems, the problem is how to keep the group data in the databases DB1, DB2 the same and consistent in relation to each other.

In the method of the invention, this problem is solved in such a way that a recovery request is made 304 for recovering the group data GD.

The second mobile system S2 generates 306 a virtual attachment request for the first database DB1 and transmits 307 that request to the first database DB1 of the first mobile system S1.

In response to that virtual attachment request, the group data GD in the first database DB1 are updated 308.

In accordance with one embodiment of the invention, the first mobile system S1 makes the above-mentioned recovery request by transmitting a recovery setup message to all those other mobile systems S2, S3, with which recovery is desired, and in response to this setup message the other mobile systems S2, S3 start recovering their group data.

Alternatively, the second mobile system S2 makes the recovery request by sending a recovery setup notification to the first mobile systems S1 with which it wishes to perform the group data recovery. In response to the recovery setup notification made, the second mobile system S2 starts recovering the group data (GD) in its second database DB2.

The invention also relates to an idea that during the recovery the home mobile system keeps a record of which attachment data are processed in recovery. When the home mobile system receives a notification from the visited mobile system of the termination of the visited mobile system's part, it goes through its database and compares whether the database has attachment data which relate to said visited mobile system and which remain unprocessed, since the visited mobile system did not notify thereof. The home mobile system generates 310 and transmits 311 said second attachment data to the visited mobile system in a virtual attachment request according to the normal attachment sequence.

Further alternatively, the home mobile system does not keep a record of the attachment data transmitted by the visited mobile system, but retrieves from its database all attachment data relating to the visited mobile system and transmits them to said visited mobile system. Simplicity is an advantage of this procedure, since no record keeping is needed. On the other. hand, resource consumption is not optimal in this case.

In the method of the invention, apart from the group data GD recovery, the location data and subscriber data of subscribers MS1, MS2 entered in the group specified in said first DB1 and second DB2 databases can be recovered subscriber-specifically.

In the method of the invention, the arrival of recovery requests and said virtual attachment requests is ensured in such a way that the recovery requests and the virtual attachment requests are retransmitted, if necessary.

Furthermore, in accordance with the invention, the virtual attachment request contains information on the age of the attachment data. In response to the information on the age of the attachment data contained in the first virtual attachment request the first mobile system S1 compares that information with the ages of possible detachment data stored in the first mobile system S1, and if the age of the attachment request is lower than the ages of the detachment data previously stored in the first mobile system S1, the first mobile system S1 accepts the virtual attachment request transmitted from the second mobile system S2, in response to which virtual attachment request the group data GD of said group call GC are updated in the first database DB1.

Whereas, if the age of the attachment request is higher than the ages of the detachment data previously stored in the first mobile system S1, the first mobile system S1 rejects the virtual attachment request transmitted from the second mobile system S2.

If said detachment data and attachment request are the same age, the attachment request can either be accepted or rejected. It is possible to make this selection involve all the cases concerned when implementing the mobile system.

In a corresponding manner, the second mobile system S2 processes the age of the second virtual attachment request transmitted by the first mobile system S1.

FIG. 3 is a block diagram of an arrangement in accordance with the invention. In the arrangement of FIG. 3, there is a group of mobile systems S1, S2, S3, in which there are at least one first mobile system S1 that comprises a first database DB1, where group data GD are maintained, at least one second mobile system S2 that comprises a second database DB2, where group data GD are maintained, and in which group there are mobile stations MS1, MS2 of which at least some communicate in the group call established within the service area SA2 of at least said second mobile system S2.

The group of mobile systems may also include a third mobile system S3, in which a group call GC2 is maintained. This group call may be a second group call or a subset of the group call maintained in the service area of the, second mobile system S2, which group call is here described in greater detail.

In the arrangement in accordance with the invention, the second mobile system S2 comprises generating means GM2 for generating a virtual attachment request for the first database DB1 and for transmitting the above mentioned virtual attachment request to the first database DB1 of the first mobile system S1, whereby the first database DB1 is arranged to update the group data GD in the first database DB1 in response to that virtual attachment request.

In the arrangement in accordance with the invention, the first mobile system S1 comprises generating means GM1 for generating a virtual attachment request for the second database DB2 and for transmitting the above-mentioned virtual attachment request to the second database DB2 of the second mobile system S2, whereby the second database DB2 is arranged to update the group data GD in the second database DB2 in response to that virtual attachment request.

In the method of the invention, the arrival of messages can be ensured, for instance, with a transmission protocol, which comprises retransmission of a termination message, if necessary. For instance, acknowledgment messages, which inform the sender whether the receiver has received the transmitted message, can be used.

If desired, the recovery of group data can be combined with the recovery of location and subscriber data, for instance, by recovering subscriber-specifically the group data concerning each subscriber as soon as said location and subscriber data have been recovered, or for instance, by recovering the group data after the location and subscriber data of all subscribers have been recovered.

The recovery rate and the recovery load can automatically be adjusted in accordance with the load factor of both the visited database and the home database in such a way that attachment requests are transmitted one by one to the effect that the network will not send a new virtual attachment request until the preceding one has been processed in both networks. Thus, the network will not start processing the new virtual attachment request until having received an acknowledgement for the preceding virtual attachment request from the other network. In case the network does not receive acknowledgement from the other network, the continuity of a sequence can be ensured in such a way that the network continues the recovery in a given period of time if the acknowledgement is not received.

If desired, the synchronization can be restricted to the transmission of a new message only: the network may process the new virtual attachment request even before receiving acknowledgement for the preceding request, and consequently the new message can be transmitted more quickly.

The method of the invention can be supplemented with deciding priorities between virtual attachment requests and other transactions, such as normal attachment requests.

Alternatively; the rate and loading can be adjusted, for instance, by making a pause between the transmission of virtual attachment requests.

If desired, the home mobile system may notify the participating visited mobile systems of the termination of recovery. This information can be used, for instance, for advising the users that either the group data or even the subscriber data and location data of subscribers have been recovered for a specific subscriber, mobile system, database or group call.

If desired, the arrival of the messages to be transmitted in the recovery sequence can be ensured, for instance, with a transmission protocol which comprises retransmission of the message, if necessary. To ensure the arrival of messages is an advantageous procedure, since it increases reliability.

It is an advantageous way to combine the recovery of group data with the recovery of location and subscriber data by recovering the group data relating to each subscriber subscriber-specifically as soon as the subscriber's location and subscriber data have been recovered, since it is easier to manage a fault in which conflicting location data are detected in the home mobile systems in connection with the group data recovery. Hence the conflict can be corrected by restarting a subscriber-specific recovery sequence from the location data recovery, and the sequence corrects both the location and the group data.

To synchronize the transmission of the virtual attachment requests with the acknowledgments from the home mobile systems is a good way of implementation, since therewith the recovery rate and the recovery load can automatically be adjusted in accordance with the load factor of both the visited and home mobile systems. This method is also simple to implement.

It is obvious to the person skilled in the art that the basic idea of the invention can be implemented in a variety of ways as technology advances. Thus the invention and its embodiments are not restricted to the above-described examples, but they may vary within the scope of the attached claims.

What is claimed is:

1. A method for recovering group data (GD) between mobile systems (S1, S2, S3), which incorporate at least one first mobile system (S1), which comprises a first database (DB1), at least one second mobile system (S2), which comprises a second database (DB2), and which mobile systems incorporate mobile stations (MS1, MS2), the method comprising the steps of maintaining (302) group data (GD) in said first database (DB1) of said first mobile system (S1), maintaining (303) said group data (GD) in said second database (DB2) of said second mobile system (S2), a recovery request is made (304) for recovering group data (GD), characterized in that the method further comprises the following steps:

the second mobile system (S2) generates (306) one or more first virtual attachment requests for the first database of the first mobile system (S1), the second mobile system (S2) sends (307) the first virtual attachment request to the first database (DB1) of the first mobile system (S1), in response to the first virtual attachment request the group data (GD) are updated (308) in the first database (DB1) and wherein from the second mobile system at least one virtual attachment request is sent per every group of the first mobile system found in the second database of the second mobile system.

2. A method as claimed in claim 1, characterized in that from the second mobile system at least one virtual attachment request is transmitted per each important subscriber attached to a group that is formed in the second mobile system.

3. A method as claimed in claim 1, characterized in that in connection with said updating step (308)
   said group data are transmitted from the first mobile system to the second mobile system at least once during the recovery.

4. A method as claimed in claim 1, characterized in that in connection with said updating step (308)
   said group data are transmitted from the first mobile system to the second mobile system every time when the first mobile system receives said virtual attachment request.

5. A method as claimed in claim 1, characterized in that the first mobile system (S1) makes the recovery request by transmitting a recovery setup message to all those other mobile systems (S2, S3) with which recovery is desired,
   in response to the recovery setup message, the other mobile systems (S2, S3) start recovering their group data.

6. A method as claimed in claim 1, characterized in that the second mobile system (S2) makes the recovery request by transmitting a recovery setup notification to those first mobile systems (S1) with whom it wishes to perform the recovery of group data,
   in response to the recovery setup notification made, the second mobile system (S2) starts recovering the group data (GD) contained in its second database (DB2).

7. A method as claimed in claim 1, characterized in that apart from the group data (GD) recovery, location data of subscribers (MS1, MS2) entered in the group specified in said first (DB1) and second (DB2) databases can also be recovered.

8. A method as claimed in claim 1, characterized in that the arrival of recovery requests and said virtual attachment requests is ensured in such a way that the recovery requests and the virtual attachment requests are retransmitted, if necessary.

9. A method as claimed in claim 1, characterized in that the virtual attachment request contains information on the age of said attachment request.

10. A method as claimed in claim 9, characterized in that
    in response to the information on the age of the attachment data contained in the first virtual attachment request the first mobile system (S1) compares that information with the ages of possible detachment data stored in the first mobile system (S1), and
    if the age of the attachment request is lower than the ages of the detachment data previously stored in the first mobile system (S1), the first mobile system (S1) accepts the virtual attachment request transmitted from the second mobile system (S2), in response to which virtual attachment request the group data (GD) are updated in the first database (DB1),
    whereas, if the age of the attachment request is higher than the ages of the detachment data previously stored in the first mobile system (S1), the first mobile system (S1) rejects the virtual attachment request transmitted from the second mobile system (S2).

11. A method as claimed in claim 1, characterized in that in the method,
    the first mobile system keeps a record in its database of the first virtual attachment requests transmitted by the second mobile system,
    on the basis of said record, the first mobile system generates and transmits the second virtual attachment requests to the second mobile system, for the groups in the service area of the second mobile system, whose home mobile system is said first mobile system, but whose attachment requests have not been entered in said record,
    in response to the second virtual attachment requests transmitted by the first mobile system, the second mobile system updates the group data on the basis of the second attachment requests.

12. A method as claimed in claim 11, characterized in that in response to the information on the age of the attachment request contained in the second virtual attachment requests, the second mobile system (S2) compares that information with the ages of possible detachment data stored in the second mobile system (S2), and
    if the age of the attachment request is lower than the ages of the detachment data previously stored in the second mobile system (S2), the second mobile system (S2) accepts the virtual attachment request transmitted from the first mobile system (S1), in response to which virtual attachment request the group data (GD) are updated in the second database (DB2),
    whereas, if the age contained in the second virtual attachment request is higher than the ages of the detachment data previously stored in the second mobile system (S2), the second mobile system (S2) rejects the virtual attachment request transmitted from the first mobile system (S1).

13. A method as claimed in claim 1, characterized in that in the method, the first mobile system retrieves from its database all the attachment data relating to the second mobile system maintained therein and transmits them to the second mobile system, with updates the group data of said groups on the basis of the attachment data.

14. A method for recovering group data (GD) between mobile systems (S1, S2, S3), which incorporate at least one first mobile system (S1), which comprises a first database (DB1), at least one second mobile system (S2), which comprises a second database (DB2), and which mobile systems incorporate mobile stations (MS1, MS2), the method comprising the steps of
    maintaining (302) group data (GD) in said first database (DB1) of said first mobile system (S1),
    maintaining (303) said group data (GD) in said second database (DB2) of said second mobile system (S2),
    a recovery request is made (304) for recovering group data (GD),
    characterized in that the method further comprises the following steps:
    the second mobile system (S2) generates (306) one or more first virtual attachment requests for the first database of the first mobile system (S1),
    the second mobile system (S2) sends (307) the first virtual attachment request to the first database (DB1) of the first mobile system (S1),
    in response to the first virtual attachment request the group data (GD) are updated (308) in the first database (DB1) and wherein
    from the second mobile system at least one virtual attachment request is transmitted per every subscriber attached to the group of the first mobile system, found in the second database of the second mobile system.

* * * * *